(12) United States Patent
Gang et al.

(10) Patent No.: US 9,940,401 B2
(45) Date of Patent: Apr. 10, 2018

(54) BUDDY SHARE

(75) Inventors: David Gang, Oakton, VA (US); Brian D. Heikes, Ashburn, VA (US); John Thomas Love, Sterling, VA (US); Janet Hall, Chevy Chase, MD (US)

(73) Assignee: Oath Inc., Dulles, VA (US)

( * ) Notice: Subject to any disclaimer, the term of this patent is extended or adjusted under 35 U.S.C. 154(b) by 3359 days.

(21) Appl. No.: 10/535,203

(22) PCT Filed: Nov. 18, 2003

(86) PCT No.: PCT/US03/36794
§ 371 (c)(1),
(2), (4) Date: Apr. 20, 2007

(87) PCT Pub. No.: WO2004/046874
PCT Pub. Date: Jun. 3, 2004

(65) Prior Publication Data
US 2008/0027909 A1   Jan. 31, 2008

Related U.S. Application Data

(60) Provisional application No. 60/426,813, filed on Nov. 18, 2002.

(51) Int. Cl.
*G06Q 30/00* (2012.01)
*G06F 17/30* (2006.01)
*G06Q 30/02* (2012.01)

(52) U.S. Cl.
CPC ........ *G06F 17/30873* (2013.01); *G06F 17/30* (2013.01); *G06Q 30/0251* (2013.01); *G06Q 30/0269* (2013.01); *G06Q 30/0271* (2013.01); *G06Q 30/0277* (2013.01)

(58) Field of Classification Search
CPC .............. G06F 17/30; G06F 17/30873; G06Q 30/0251; G06Q 30/0269; G06Q 30/0271; G06Q 30/0277
USPC ................... 705/14.49, 14.66, 14.67, 14.73; 707/E17.109
See application file for complete search history.

(56) References Cited

U.S. PATENT DOCUMENTS

| | | | |
|---|---|---|---|
| 6,308,175 B1 | 10/2001 | Lang et al. | |
| 6,529,949 B1 | 3/2003 | Getsin et al. | |
| 6,845,448 B1* | 1/2005 | Chaganti et al. | 713/166 |
| 7,546,537 B2* | 6/2009 | Crawford | 715/753 |
| 2001/0037463 A1* | 11/2001 | Salta | 713/201 |
| 2002/0052921 A1* | 5/2002 | Morkel | 709/206 |
| 2003/0121008 A1* | 6/2003 | Tischer | 715/530 |
| 2004/0030599 A1* | 2/2004 | Sie | G06Q 30/02 705/14.4 |
| 2005/0131721 A1* | 6/2005 | Doctorow et al. | 705/1 |

(Continued)

OTHER PUBLICATIONS

PCT International Search Report dated May 26, 2005, 7 pages.

*Primary Examiner* — Raquel Alvarez
(74) *Attorney, Agent, or Firm* — Finnegan, Henderson, Farabow, Garrett & Dunner, L.L.P.

(57) ABSTRACT

Sharing content includes classifying content perceived by a sharing user, determining a set of recipient candidates likely to be interested in the content based upon the classification of the content and prior sharing activity of the recipients with respect to content of the same or similar classification, and presenting to the sharing user one or more members of the set of recipient candidates for sharing the content being perceived by the sharing user.

43 Claims, 10 Drawing Sheets

(56) References Cited

U.S. PATENT DOCUMENTS

2007/0226628 A1* 9/2007 Schlack .................. 715/733
2015/0237399 A1* 8/2015 Grandy .............. H04N 21/4622
                                                                           725/1

* cited by examiner

BUDDY SHARE

CROSS-REFERENCE TO RELATED APPLICATIONS

This application is a National Stage of International Application No. PCT/US2003/036794, filed Nov. 18, 2003, which claims the benefit of U.S. Provisional Application No. 60/426,813, filed Nov. 18, 2002, both of which are incorporated by reference.

TECHNICAL FIELD

This description relates to sharing of content and more particularly to sharing of content based on prior sharing experience.

BACKGROUND

Online service providers facilitate access to information and services, allowing users to navigate to desired resources, including content such as online content. When a user is online, the user may want to share content with recipients who may find the content interesting. Typically, the user manually starts a separate communication application in order to send a link or message sharing the content.

SUMMARY

Users are enabled to more easily share content with recipients with whom they have a common interest. For example, when content of interest is encountered by a user, a separate communication interface may be automatically started depending upon one or more appropriate factors.

In one general aspect, sharing content includes classifying content perceived by a sharing user, determining a set of recipient candidates likely to be interested in the content based upon the classification of the content and prior sharing activity of the recipients with respect to content of the same or similar classification, and presenting to the sharing user one or more members of the set of recipient candidates for sharing the content being perceived by the sharing user.

Implementations may include one or more of the following features. For example, the content may include online content or Internet content. The content may be classified by determining a level of classification granularity. Determining the set of recipient candidates may include doing so based upon information made available by a potential recipient candidate, based upon active manipulation by the sharing user, based upon information supplied by a third party, and/or based upon passive personalization. The content may be classified automatically at a sharing user system.

The set of recipient candidates may be determined dynamically. In one implementation, a set of recipient candidates is determined by selecting the recipient candidates based on a matching between the content and an interest of the recipient. Determining a set of recipient candidates may include having a sharing user system or a host system select one or more recipient candidates.

The content may be shared in several ways, including through use of an instant message, a chat room, and/or an e-mail message. An online presence status may be received for one or more members of the set of recipient candidates, and one or more communications options may be presented to the sharing user for sharing the content with a recipient candidate based upon the online presence status of the recipient candidate. Presenting one or more communications options may include configuring one or more communications channels such as an instant messaging communications channel, a chat communications channel, and an e-mail communications channel. Classifying the content may include identifying a change in the content, and a set of recipient candidates may be determined based upon the changed content.

The sharing user may browse to content. A determination may be made as to whether the content is sharable, and, if so, an indication may be rendered to the sharing user to indicate that the content is sharable. The indication may include a visual indication or an audible indication.

The set of recipient candidates may be stored as a sharing list. The sharing list may be retrieved and may be updated based upon the determined set of recipient candidates.

In another general aspect, a user interface enables sharing of content. The user interface includes an application user interface that enables perception of content by a sharing user, a mechanism that receives a set of recipient candidates determined likely to be interested in the content based upon the classification of the content and prior sharing activity of the recipients with respect to content of the same or similar classification, and a mechanism that presents to the sharing user with one or more members of the set of recipient candidates with whom the content being perceived by the sharing user may be shared.

Implementations may include one or more of the following features. For example, the user interface may include a mechanism that receives an online presence status for one or more members of the set of recipient candidates and a mechanism that presents to the sharing user one or more communications options for sharing the content with a recipient candidate based upon the online presence status of the recipient candidate.

The user interface may also include a mechanism that enables one or more menu options for a recipient candidate based upon the online presence status of the recipient candidate, with menu options enabled for a first online presence state differing from menu options enabled for a second online presence state, and a mechanism that presents the enabled menu options to the sharing user. The mechanism that presents one or more communications options includes a mechanism that configures one or more communications channels. The communications channels include one or more of an instant messaging communications channel, a chat communications channel, and an e-mail communications channel.

The user interface also may include a mechanism that determines whether the content is sharable, and, if so, a mechanism that renders an indication to the sharing user that the content is sharable. The indication may include a visual indication or an audible indication.

Aspects of sharing content based upon prior sharing experience may be implemented by an apparatus and/or by a computer program stored on a computer readable medium. The computer readable medium may include a disc, a client device, a host device, and/or a propagated signal. In addition, aspects of sharing content based upon prior sharing experience may be implemented in a client/host context or in a standalone or offline client device.

Other features will be apparent from the following description, including the drawings, and from the claims.

Figure 1:
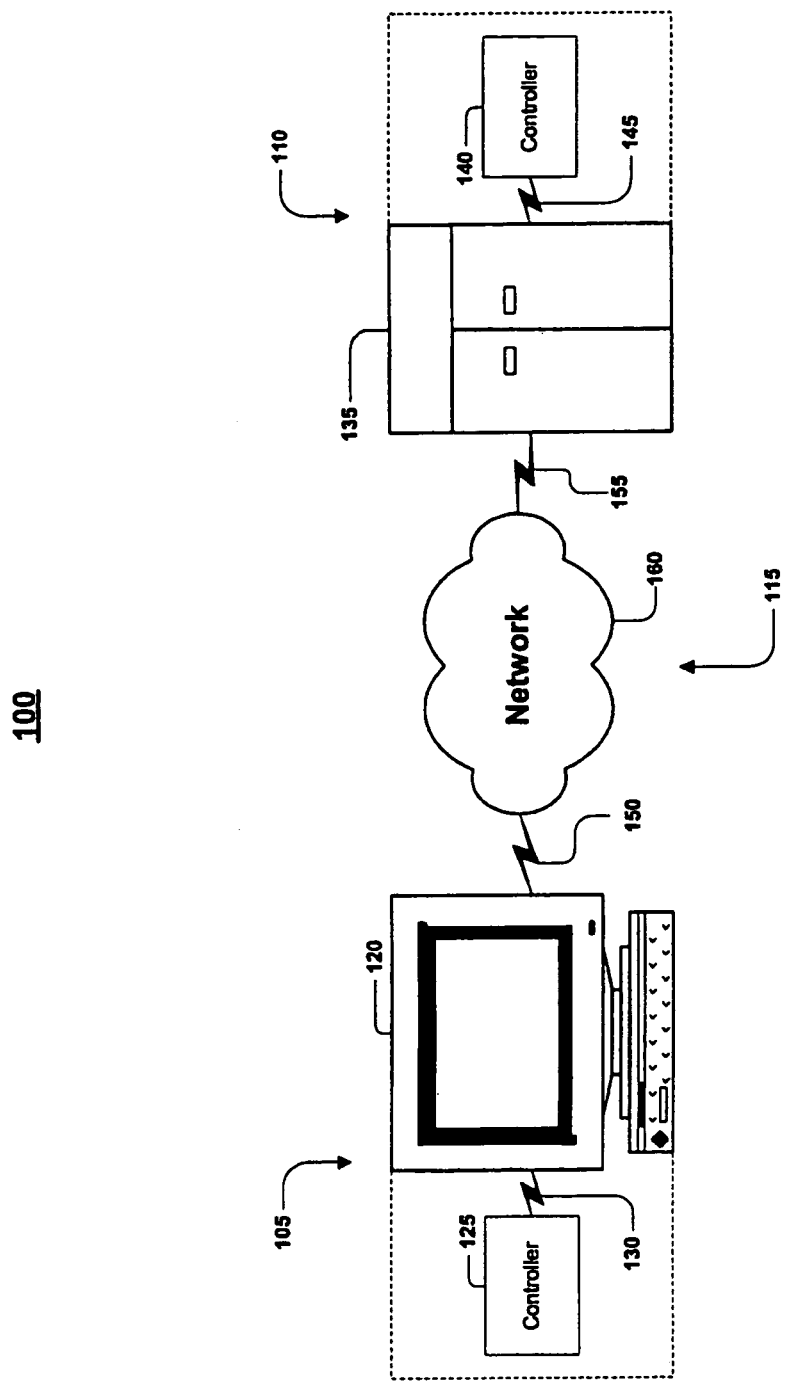
FIGS. 1-4 are block diagrams of an exemplary communications system.

For brevity, several elements in the figures described below are represented as monolithic entities. However, as would be understood by one skilled in the art, these elements each may include numerous interconnected computers and components designed to perform a set of specified operations and/or may be dedicated to a particular geographic region.

DETAILED DESCRIPTION

Techniques are described for enabling a user ("the sharing user") to more easily share content of interest with other users ("recipients") who are likely to have an interest in the content. For example, recipients with whom the sharing user has previously shared the same or similar type or origin of content may be deemed likely to be interested in the content. Filtering recipients with whom the sharing user desires to share content based upon the likelihood that an interaction or conversation will be generated based upon the sharing of the content in question. This filtering may involve the intersection of the sharing user's interests, the sharing user's relationship with the recipients, and the interests of those recipients.

When a sharing user encounters online content that the sharing user wishes to share, the sharing user may manipulate a user interface (UI) that displays a sharing history, categorizes the content shared, and enables sharing of the content with one or more designated buddies or groups of buddies (i.e., recipients with whom the sharing user has a relationship through e-mail correspondence, instant messaging (IM) correspondence, or otherwise). The interface, which may be called a "sharelist," displays the buddies with whom the sharing user previously has shared the same or similar type of content, and also may display buddies who previously have shared the same or similar type of content with the sharing user.

For example, if a sharing user encounters online content relating to a favorite recording artist, the sharing user may wish to share that content with other buddies with whom the sharing user has shared the same type of content (i.e., other content relating to that artist). Or the sharing user may wish to share the content with buddies with whom the sharing user has shared similar content (i.e., other content relating to the musical genre to which the artist belongs, such as classical, country, jazz, or rock).

As a further example, the sharing user may browse to a web page with content for a particular pop music artist (e.g., Britney Spears). Depending upon user settings, a list of buddies with whom the sharing user has shared similar content is generated. At one level of granularity, a list of buddies with whom the sharing user has shared other content related to the particular artist may be generated. At another level of granularity, a list of buddies with whom the sharing user has shared other pop music content may be generated. The sharing user then is able to share the content with appropriate buddies who may be interested in the content at the chosen level of granularity. The sharing usually is not performed automatically (to prevent excessive sharing of content), but rather is facilitated by the sharing feature.

A visual mechanism may be provided to indicate that certain content is sharable or has been shared in the past. For example, when a user browses to sharable content, an icon may be animated to alert the user. When the user clicks on the icon, a sharelist may be generated.

Information indicating the identity of buddies who may be interested in user-encountered content may come from several sources, which may differ from sources that indicate which sharing has already occurred in the past. This information may be obtained from user published information gathered from a variety of sources or may be obtained from passively collected information such as traffic or transaction patterns. For example, the information may be gathered from member directory information that a buddy on a user's instant messaging buddy list decides to make publicly available. In another example, a buddy could choose to make available to the sharing user a list of recently visited web sites or content browsed.

Content may be categorized manually or automatically at one or more levels of granularity, with the number of content categories chosen so as to be broad enough to be meaningful but not so broad as to be bewildering in variety. Content may be automatically categorized using a search engine and/or other techniques. For example, the hierarchy of channels@AOL may be used to categorize the content (e.g., categories of music, genre, artist).

The sharelist may be generated dynamically ("on-the-fly") each time content is encountered, or may be pre-stored, for example, in a database. A pre-stored sharelist may be updated periodically or may be updated after a sharing event. The sharelist may be generated by accounting for the relationship of the sharing user and the content, the relationship between the sharing user and the buddy, and the relationship between the buddy and the content. When there is an overlap in these relationships, the content may be recommended for sharing with the buddies by the sharing user.

The sharing user may choose to share the content with buddies on the sharelist using one or more communications methods such as IM, chat, or e-mail, depending upon the online status of the buddy or buddies with whom the sharing user desires to share the content. Content may be shared on an individual basis or on a group basis. The groups may be created through active manipulation by the sharing user, by passive personalization, or by a party other than the sharing user. A default group of recipients may be used where there is no prior sharing history. The groups may include user-defined or pre-defined categories, such as business, professional, educational, friends, and family. The sharing of content is usually performed with at least some manual intervention by the sharing user, but may also be done automatically without sharing user intervention.

Sharing users and buddies may be provided with the ability to opt out of sharing with respect to certain types of content, certain buddies and/or certain groups.

The sharing feature provides a roving knowledge of other buddies (i.e., people known to the sharing user) who may be interested in the online content encountered by the sharing user as the sharing user navigates around the web or other online content.

Many types of information and content may be shared in a similar manner. For example, in addition to web or intranet content, a sharelist may be generated for a sharing user who is browsing appointments on a calendar. For instance, the sharing user may wish to share appointments for parties, meetings, social events, or sporting events with an appropriate group of buddies. Other types of information that may be shared include address book entries, such as customers or business leads to be shared with a sales force, and digital photographs or albums. The information may be shared in a variety of social contexts, including those involving business and professional contexts, friendship, sports, school or university settings, clubs, and professional organizations.

Figure 2:
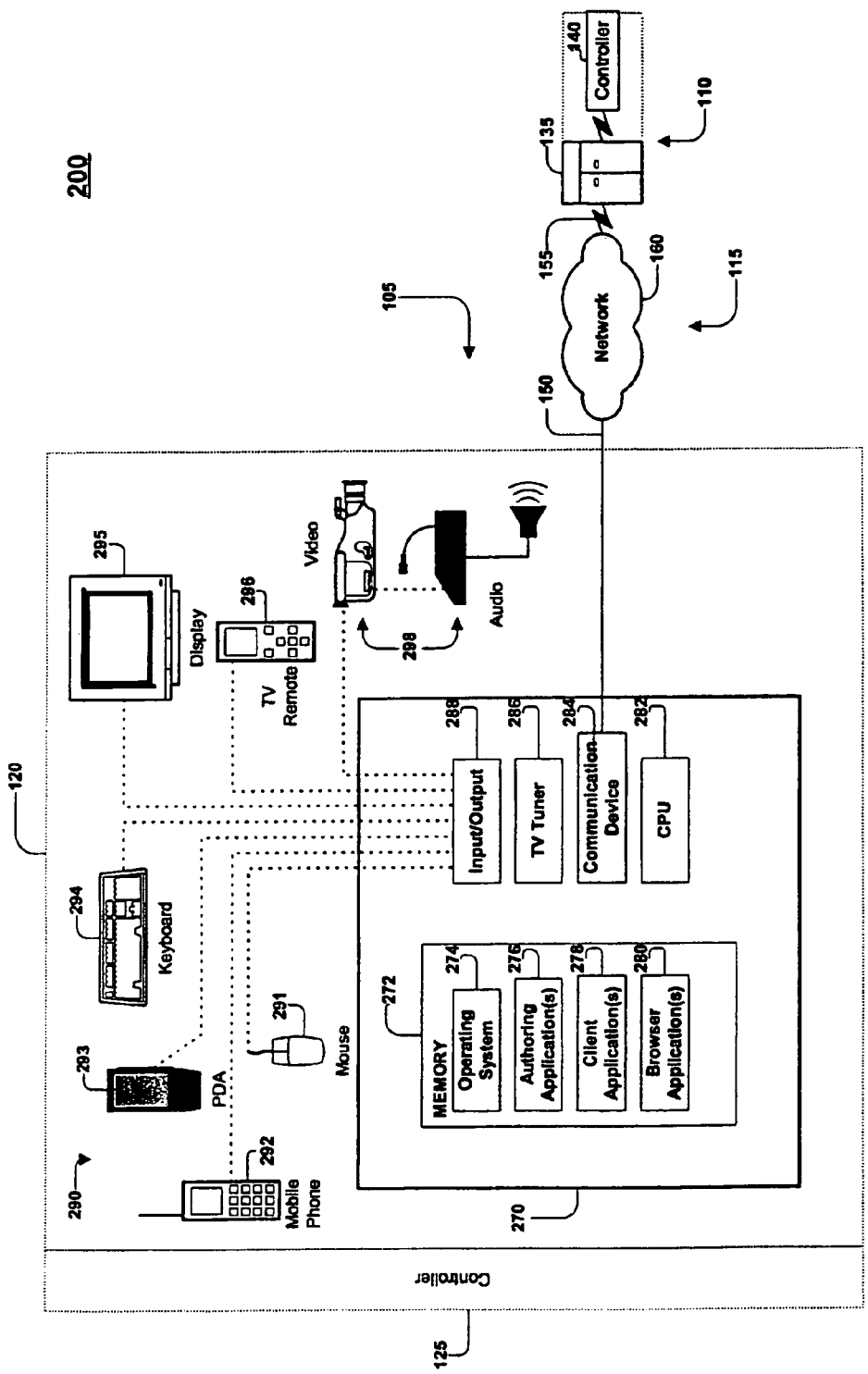

For illustrative purposes, FIGS. 1 and 2 show an example of a communications system for implementing techniques for transferring electronic data.

Referring to FIG. 1, a communications system 100 is capable of delivering and exchanging data between a client system 105, including a sharing user system or a recipient system, and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 and the host device 135 generally are capable of executing instructions under the command of, respectively, a client controller 125 and a host controller 140. The client device 120 and the host device 135 are connected to, respectively, the client controller 125 and the host controller 140 by, respectively, wired or wireless data pathways 130 and 145 that are capable of delivering data.

The client device 120, the client controller 125, the host device 135, and the host controller 140 typically each include one or more hardware components and/or software components. An example of a client device 120 or a host device 135 is a general-purpose computer (e.g., a personal computer) or software on such a computer capable of responding to and executing instructions in a defined manner. Other examples include a special-purpose computer, a workstation, a server, a device, a component, other physical or virtual equipment or some combination of these capable of responding to and executing instructions. The client device 120 and the host device 135 may include devices that are capable of establishing peer-to-peer communications.

An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination of these for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 and the host device 135.

The communications link 115 typically includes a delivery network 160 that provides direct or indirect communication between the client system 105 and the host system 110, irrespective of physical separation. Examples of a delivery network 160 include the Internet; the World Wide Web; WANs; LANs; analog or digital wired and wireless telephone networks (e.g., Public Switched Telephone Network (PSTN), Integrated Services Digital Network (ISDN), and Digital Subscriber Line (xDSL)); radio, television, cable, or satellite systems; and other delivery mechanisms for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

FIG. 2 illustrates a communications system 200 including a client system 105 communicating with a host system 110 through a communications link 115. The client system 105 includes a client device 120 that typically includes a general-purpose computer 270 having an internal or external memory 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing programs, database programs, spreadsheet programs, or graphics programs) capable of generating documents or other electronic content; client applications 278 (e.g., America Online (AOL) client, CompuServe client, AOL Instant Messenger (AIM) client, an interactive television (ITV) client, an internet service provider (ISP) client, or an instant messaging (IM) client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content and other content formatted according to standard protocols such as the Hypertext Transfer Protocol (HTTP).

Several communications applications and protocols, such as instant messaging or chat, may be used by communications system 200. Typically, instant messaging (IM) communications involve an instantaneous or nearly instantaneous communication between two users, where each user is able to transmit, receive and display communicated information. Additionally, IM communications involve the display and perception of online presence information regarding other selected users ("buddies"). The IM communications may be machine-to-machine communications that occur without intervention by or communication through an instant messaging server after a communication session is established or authentication is performed. Examples of IM communications exist over AIM (America Online Instant Messenger), AOL (America Online) Buddy List and Instant Messages, Yahoo Messenger, MSN Messenger, and ICQ, among others. Although some examples of sharing online media experiences are discussed below using IM applications, other implementations provide similar functionality in platforms and online applications such as chat or e-mail.

Chat communications typically involve an instantaneous or nearly instantaneous communication between two or more users in a "chat room," where each user is able to transmit, receive and display communicated information. Additionally, chat communications may involve the display and perception of online presence information regarding other selected participants in the chat room. However, chat communications may occur in the absence of online presence information. The chat communications may be machine-to-machine communications that occur without intervention by or communication through a chat server after a communication session is established or authentication is performed. Examples of chat communications exist over AOL (America Online) and CompuServe, among others.

One or more of the application programs may be installed on the internal or external storage 272 of the general-purpose computer 270. Alternatively, in another implementation, the client controller 125 may access application programs externally stored in and/or performed by one or more device(s) external to the general-purpose computer 270.

The general-purpose computer 270 also includes a central processing unit 282 (CPU) for executing instructions in response to commands from the client controller 125, and a communication device 284 for sending and receiving data. One example of the communication device 284 is a modem. Other examples include a transceiver, a set-top box, a communication card, a satellite dish, an antenna, a network adapter, or some other mechanism capable of transmitting and receiving data over the communications link 115 through a wired or wireless data pathway 150. The general-purpose computer 270 optionally includes a television ("TV") tuner 286 for receiving television programming in the form of broadcast, satellite, and/or cable TV signals. The TV tuner 286 permits the client device 120 to selectively and/or simultaneously display network content received by communications device 284 and TV programming content received by the TV tuner 286.

The general-purpose computer 270 may include an input/output interface 288 that enables wired or wireless connection to various peripheral devices 290. Examples of peripheral devices 290 include, but are not limited to, a mouse 291, a mobile phone 292, a personal digital assistant (PDA) 293, an MP3 player (not shown), a keyboard 294, a display monitor 295 with or without a touch screen input, a TV remote control 296 for receiving information from and rendering information to users, and an audiovisual input device 298.

Although FIG. 2 illustrates devices such as a mobile telephone 292, a PDA 293, and a TV remote control 296 as being peripheral with respect to the general-purpose computer 270, other implementations may have such devices themselves include the functionality of the general-purpose computer 270 and operate as the client device 120. For example, the mobile phone 292 or the PDA 293 may include computing and networking capabilities and may function as a client device 120 by accessing the delivery network 160 and communicating with the host system 110. Furthermore, the client system 105 may include one, some or all of the components and devices described above.

Figure 3:
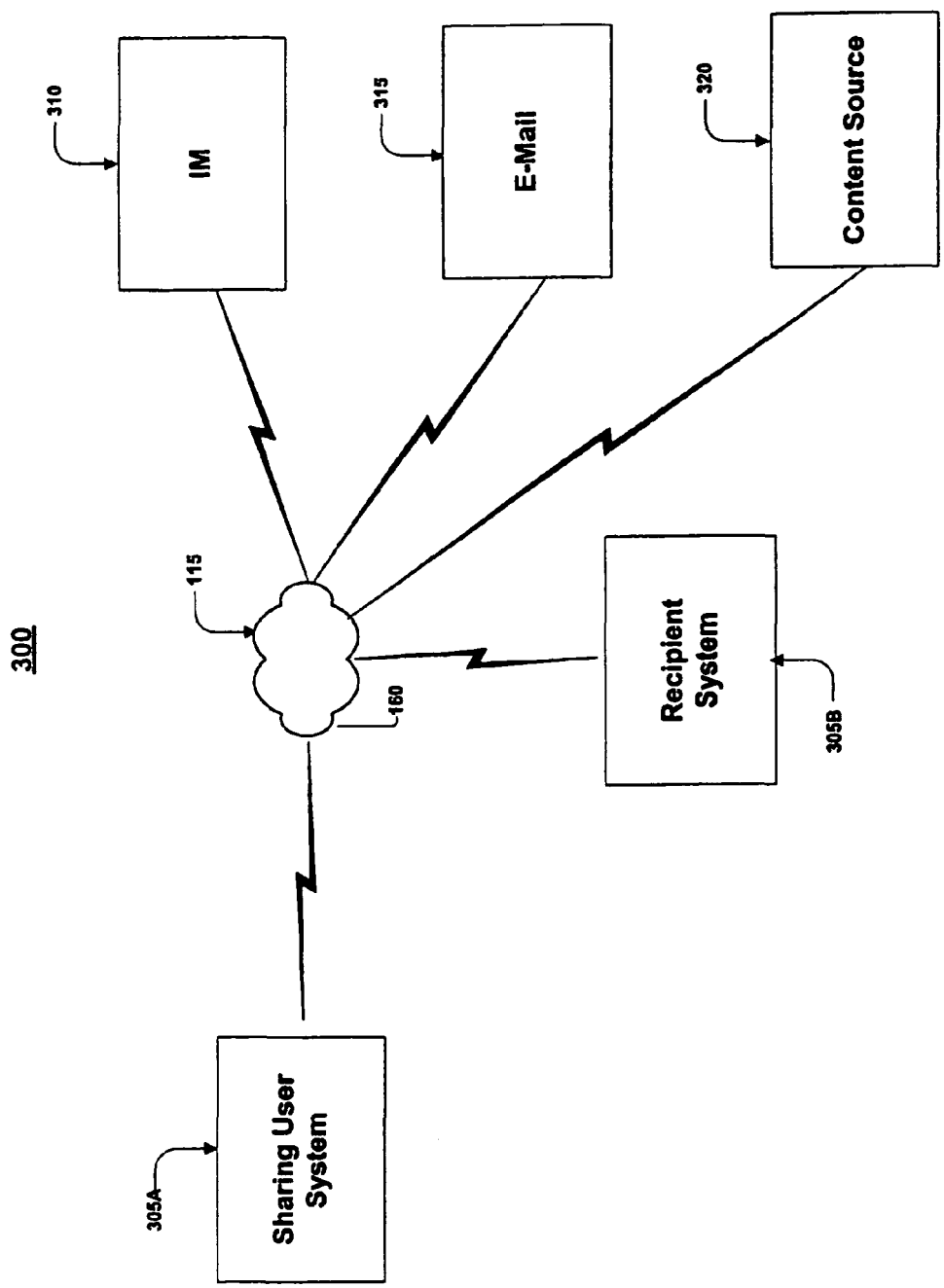

FIG. 3 illustrates a communications system 300 including a sharing user system 305A communicating with a recipient system 305B, an IM host system 310, an e-mail host system 315, and a content source 320 through a communication link 115. Such a communications system 300 may be available to users of IM service providers, such as, for example, AIM, ICQ, Yahoo Messenger, and Microsoft Messenger, users of email service providers, and users of content service providers, such as, for example, Internet service providers (ISPs) including America Online, Microsoft, Yahoo, and Earthlink.

The IM host system 310 may have characteristics similar to those described above with respect to the host system 110. The sharing user system 305A and the recipient system 305B, which may have characteristics similar to those described above with respect to the client system 105, include communication software to enable users of the client systems to access the IM host system 310, the e-mail host system 315, and the content source 320.

The IM host system 310 may support IM services irrespective of a sharing user's network or Internet access. Thus, the IM host system 310 may allow users to send and receive IMs, regardless of whether they have access to any particular ISP. The IM host system 310 also may support associated services, such as administrative matters, advertising, directory services, chat, and interest groups. The IM host system 310 has an architecture that enables the devices (e.g., servers) within the IM host system 310 to communicate with each other. To transfer data, the IM host system 310 employs one or more standard or exclusive IM protocols.

To access the IM host system 310 to begin an IM session in the implementation of FIG. 3, the sharing user system 305A establishes a connection to the IM host system 310. Once a connection to the IM host system 310 has been established, the sharing user system 305A may directly or indirectly transmit data to and access content from the IM host system 310. By accessing the IM host system, a sharing user can use the IM client application to view whether particular users ("buddies") are online, exchange IMs with particular buddies, participate in group chat rooms, trade files such as pictures, invitations or documents, find other buddies with similar interests, get customized information such as news and stock quotes, and search the Web. Recipient system 305B may be similarly manipulated to establish a contemporaneous connection with IM host system 310.

Once connectivity is established, a sharing user who is using sharing user system 305A views whether a recipient using recipient system 305B is online and able to receive IMs. If the recipient is online, the sharing user may exchange IMs with the recipient.

In one implementation, the IMs sent between sharing user system 305A and recipient system 305B are routed through IM host system 310. In another implementation, the IMs sent between sharing user system 305A and recipient system 305B are routed through a third party server (not shown), and, in some cases, also are routed through IM host system 310. In yet another implementation, the IMs are sent directly between sharing user system 305A and recipient system 305B.

The e-mail host system 315 may have characteristics similar to those described above with respect to the host system 110 and the IM host system 310.

The e-mail host system 315 may support e-mail services irrespective of a sharing user's network or Internet access. Thus, the e-mail host system 315 may allow users to send and receive e-mail, regardless of whether they have access to any particular ISP. The e-mail host system 315 also may support associated services, such as administrative matters, advertising, directory services, and other services related to e-mail. The e-mail host system 315 has an architecture that enables the devices (e.g., servers) within the e-mail host system 315 to communicate with each other. To transfer data, the e-mail host system 315 employs one or more standard or exclusive e-mail protocols.

The content source 320 may have characteristics similar to those described above with respect to the host system 110. The content source 320 may be, for example, a server connected to a delivery network 160 such as the Internet, and accessible by the sharing user system 305A and the recipient system 305B, among others.

Figure 4:
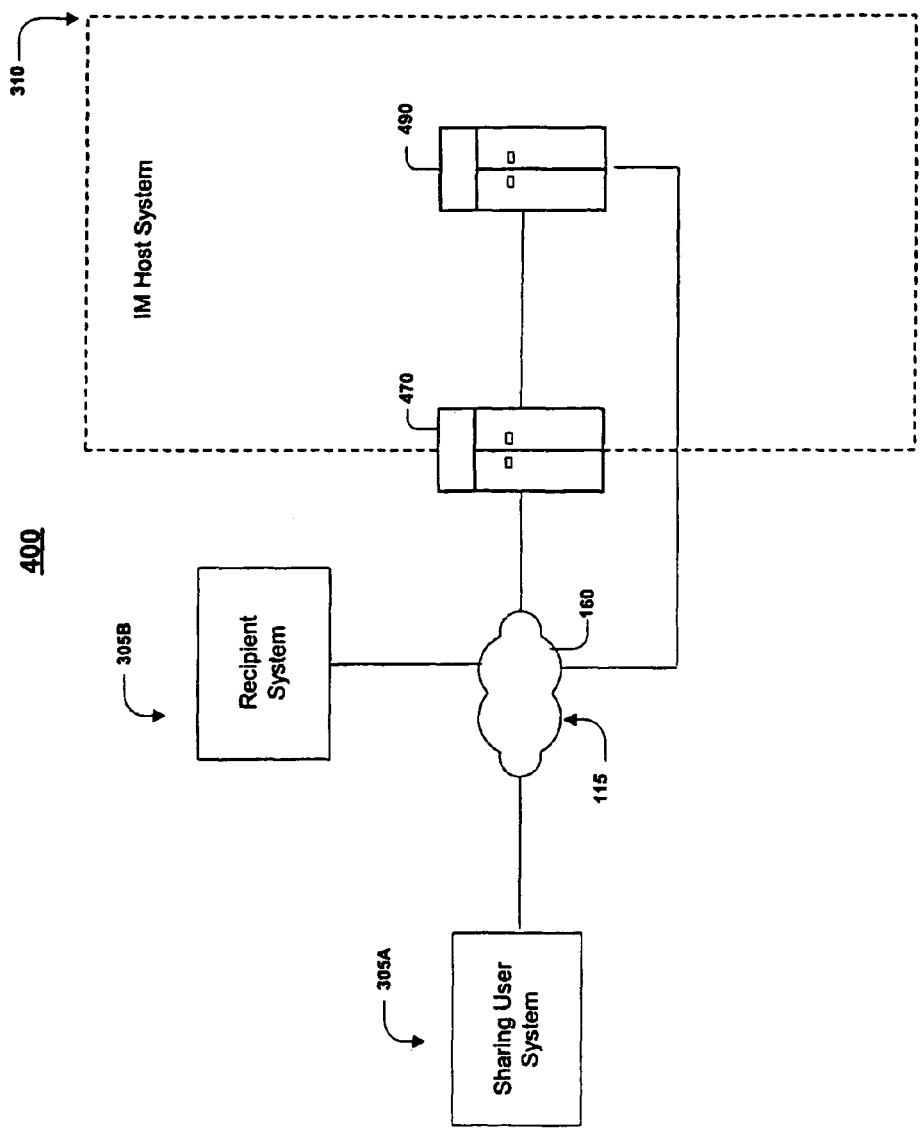

FIG. 4 illustrates a communications system 400 including a sharing user system 305A communicating with a recipient system 305B and an IM host system 310 through a communication link 115. System 400 illustrates a possible implementation of the communications system 300 of FIG. 3.

In system 400, the IM host system 310 includes a login server 470 for enabling access by users and routing communications between the sharing user system 305A, the recipient system 305B, and other elements of the IM host system 310. The IM host system 310 also includes an IM server 490. To enable access to and facilitate interactions with the IM host system 310, the sharing user system 305A and the recipient system 305B may include communication software, such as, for example, an ISP client application and/or an IM client application.

The sharing user system 305A may establish a connection to the login server 470 in order to access the IM host system 310 and begin an IM session. The login server 470 typically determines whether the particular sharing user is authorized to access the IM host system 310 by verifying the sharing user's identification and password. If the sharing user is authorized to access the IM host system 310, the login server 470 usually employs a hashing technique on the sharing user's screen name to identify a particular IM server 490 within the IM host system 310 for use during the sharing user's session. The login server 470 provides the sharing user system 305A with the IP address of the IM server 490, gives the sharing user system 305A an encrypted key, and breaks the connection. The sharing user system 305A then uses the IP address to establish a connection to the particular IM server 490 through the communications link 115, and uses the encrypted key to obtain access to the IM server 490. Typically, the sharing user system 305A is able to establish an open TCP connection to the IM server 490. The recipient system 305B establishes a connection to the IM host system 310 in a similar manner.

In one implementation, the sharing user system 305A may directly or indirectly transmit data to and access content from the IM server 490 once a connection to the IM server 490 has been established. By accessing the IM server, a sharing user can leverage the IM client application to determine whether particular users ("buddies" or potential recipients) are online, exchange IMs with particular buddies, participate in group chat rooms, trade files such as pictures, invitations or documents, find other buddies with similar interests, get customized news and stock quotes, and search the Web. For example, a sharing user who is using sharing user system 305A may view whether a buddy using recipient system 305B is online, and if so, may exchange IMs with that buddy.

The IMs sent between sharing user system 305A and recipient system 305B may be routed through IM host system 310, routed through a third party server (not shown, or the IMs may be sent directly between sharing user system 305A and recipient system 305B.

The IM host system 310 may include a user profile server (not shown) connected to a database (not shown) for storing large amounts of user profile data. The user profile server may be used to enter, retrieve, edit, manipulate, or otherwise process user profile data. In one implementation, a user's profile data includes, for example, the user's screen name, buddy list, geographic location, and identified interests, including interests in various categories of online content and/or other content. The sharing user or the recipient may enter, edit and/or delete profile data using an installed IM client application on the sharing user system 305A or on the recipient system 305B to interact with the user profile server.

Because the user's data are stored in the IM host system 310, the sharing user and the recipient do not have to reenter or update such information in the event that the sharing user or the recipient accesses the IM host system 310 using a new or different sharing user system 305A or recipient system 305B. Accordingly, when, for example, the sharing user accesses the IM host system 310, the IM server 490 can instruct the user profile server to retrieve the sharing user's profile data from the database and to provide, for example, the sharing user's buddy list to the IM server 490. Alternatively, user profile data may be saved locally on the sharing user system 305A.

Systems similar to those shown by FIGS. 3 and 4 may be used to enable similar functionality with respect to non-IM communications schemes, for example, such as that described with respect to FIG. 2.

Figure 5:
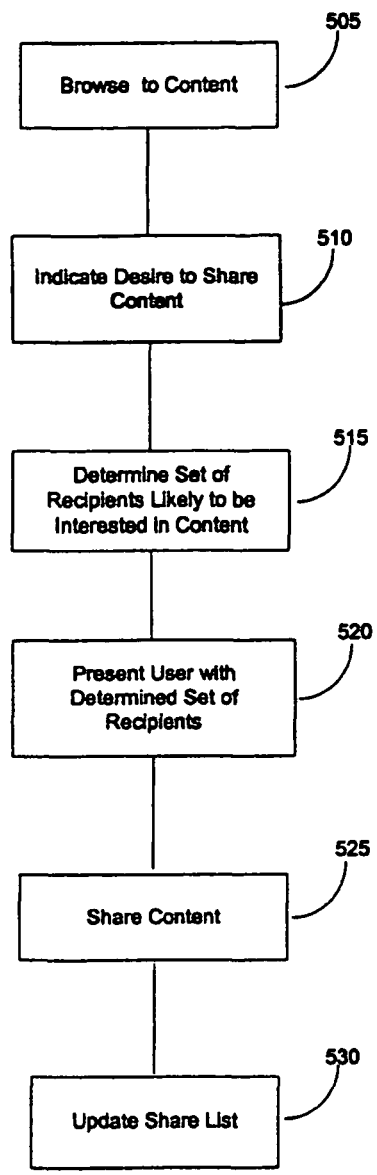
FIGS. 5 and 6 are flow charts of exemplary processes that may be implemented by systems such as those of FIGS. 1-4.
Figure 6:
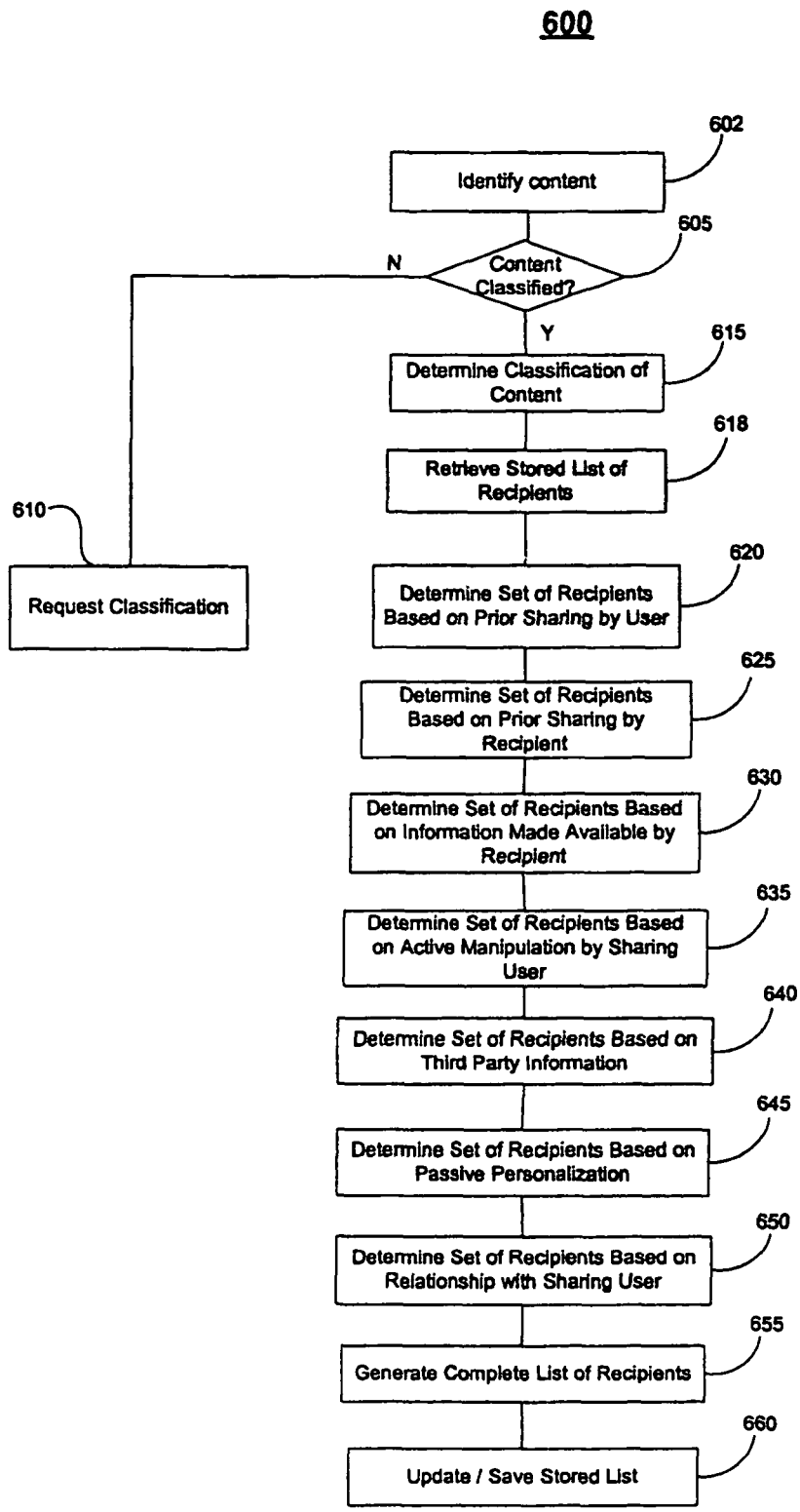

FIGS. 5 and 6, illustrate exemplary procedures 500 and 600 to enable a sharing user system 305A to share online content of interest with one or more recipient systems 305B. The procedures 500 and 600 may be implemented by hardware, software, devices, computers, computer systems, equipment, components, programs, applications, code, storage media, or propagated signals. The procedures 500 and 600 may be implemented in a client/host context, or a standalone or offline client context. The online content may be shared by the standalone/offline device and may be accessed or updated through a remote device in a non-client/host environment, such as, for example, a LAN server serving an end user or a mainframe serving a terminal device. Thus, the procedures 500 and 600 described below may be implemented for an OSP, ISP, browser and/or other software program, such as programs for playing online media (media players), instant messaging, chat, electronic mail and stand-alone browsers.

Procedures 500 and 600 generally involve sharing online content by a sharing user with one or more recipients based on prior sharing experience. While some functions of procedures 500 and 600 may be performed entirely by the sharing user system 305A or the recipient system 305B, other functions may be performed by a host system 110, or by the collective operation of the sharing user system 305A, the recipient system 305B, and/or the host system 110. The host system 110 may be, for example, an IM host system 310, the e-mail host system 315, and/or the content source 320.

Referring to FIG. 5, in the procedure 500, the sharing user system 305A browses to content of interest (step 505). For instance, sharing user system 305A may connect to the host system 110 across a network (e.g., network 160) by supplying a sharing user identification and password to a server (e.g., a login server) in order to obtain access to the host system 110. Using an application such as a browser application 280, the sharing user system 305A may browse to content accessible through the content source 320.

In one implementation, a mechanism is provided to indicate that the content is sharable or has been previously shared. For example, the mechanism may be a visual and/or an audible indication that the content to which the sharing user has browsed has been or may be shared with one or more recipients. An icon may be provided and may be animated or otherwise visually or audibly distinguished when the sharing user encounters sharable content. The sharing user may click on the icon in order to be provided with a sharelist UI as described below.

Next, the sharing user indicates a desire to share the content (step 510). The sharing user may indicate the desire to share the content by manipulating a user interface control. For example, the sharing user may click on an icon or otherwise manipulate a user interface to indicate the desire to share content. The desire to share content also may be automated. For example, the sharing user may indicate in advance various content types or categories that the user wishes to share when such content is encountered. An application running on the sharing user system 305A may monitor the content being viewed by the sharing user and compare the content against the pre-designated content of interest. When pre-designated content of interest is encountered, the application may render a user interface suggesting that the sharing user share the content being viewed. In one implementation, the application will initiate a sharing of content matching the designated content of interest without asking for user permission.

In one implementation, the sharing user's desire to share content may be inferred, and a sharelist may be generated, when the user encounters sharable content. The sharing user may be enabled to limit the automatic generation of a sharelist to certain categories of content.

Next, the set of recipients likely to be interested in the content is determined (step 515). In particular implementations, the sharing user system 305A or the host system 110 determines the set of recipients likely to be interested in the content. In one implementation, the determination is made manually by the sharing user by, for example, selecting a buddy from a buddy list. In another implementation, the determination is made automatically by the sharing user system 305A or the host system 110. For example, the determination may be made based upon a matching between a list of recipients designated or generated by the sharing user and known interests of the designated recipients. The matching may account for the relative frequency of content sharing with recipients, and also may account for how recently the sharing activity occurred. Default values may be used to populate the sharelist if insufficient prior sharing activity has taken place. In other implementations, the identification may be made on-the-fly by the sharing user, by the sharing user system, or by the host.

The sharing user is next presented with the set of recipients determined to likely be interested in the content (step 520). Presenting the set of recipients may include presenting one or more feasible communications channels over which the sharing user may share the content with a recipient. For example, based upon the online presence of the determined set of recipients, the sharing user may be presented with an option to send an instant message to those recipients in the determined set of recipients who are also online, and may be presented with an option to send an e-mail message to those recipients in the determined set of recipients who are not online. In one implementation, the sharing user may be able to edit, add or delete entries from the sharelist interface.

Figure 7:
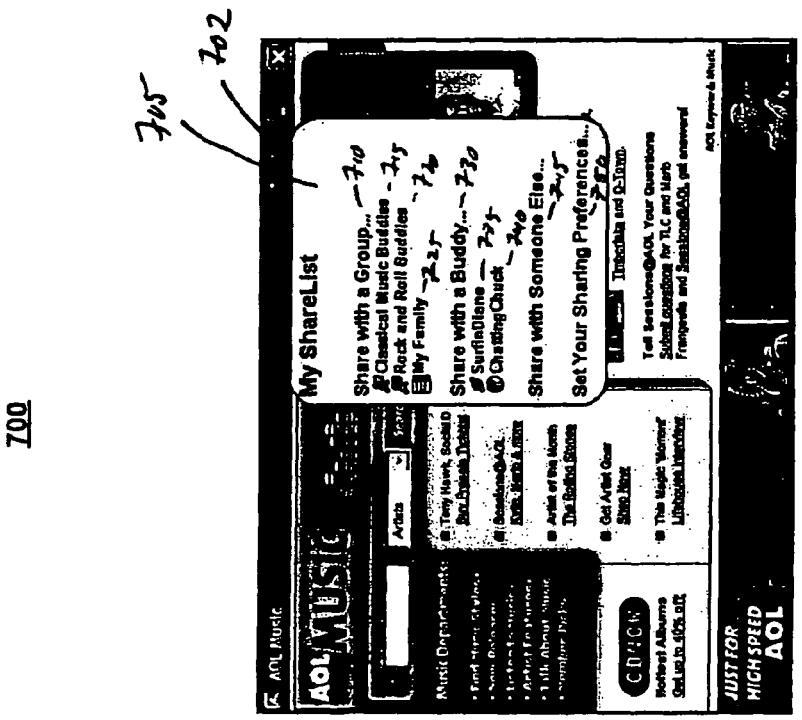
FIGS. 7-10 are illustrations of different graphical user interfaces that may be implemented by systems such as those of FIGS. 1-4 when executing processes such as those of FIGS. 5 and 6.

Presenting the user with the determined set of recipients may include rendering a user interface. Referring to FIG. 7, a user interface 700 includes a My Share List user interface 705. The UI 700 also may include an icon 702 that indicates that the content page contains sharable content and/or content which has previously been shared. The My Share List user interface 705 contains a list of the identified recipients that is generated, for example, through a process such as the process 600 described below with respect to FIG. 6. As shown, the My Share List 705 includes an option to share with a group 710, such as the Classical Music Buddies 715, Rock and Roll Buddies 720, and My Family 725. The My Share List interface 705 also includes options to share with individual buddies 730 such as Surfin Diane 735 and Chatting Chuck 740. The My Share List interface 705 also includes options to share with someone else 715. The share with someone else 715 option allows the sharing user to manually include other potential recipients. An option to set sharing preferences 750 is also provided to the sharing user in the interface 705.

Figure 8:
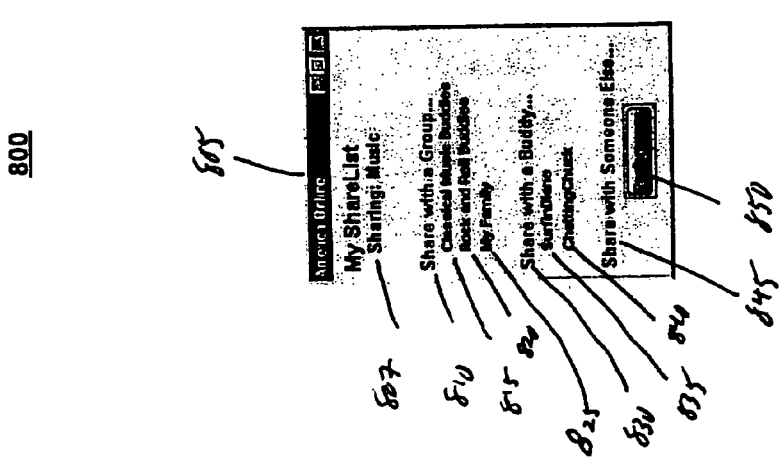

FIG. 8 shows an implementation of another user interface 800. In particular, the user interface 800 includes a My Share List interface 805. The My Share List 805 includes a category of content being shared 807, which in this case is music. The my share interface 805 includes the option to share with a group 810, such as the Classical Music Buddies 815, Rock and Roll Buddies 820, and My Family 825. The interface 805 also includes an option to share with an individual buddy 830, including Surfin Diane 835 and Chatting Chuck 840. The interface 805 also includes an option to share with someone else 845 and to adjust preferences 850.

Figure 9:
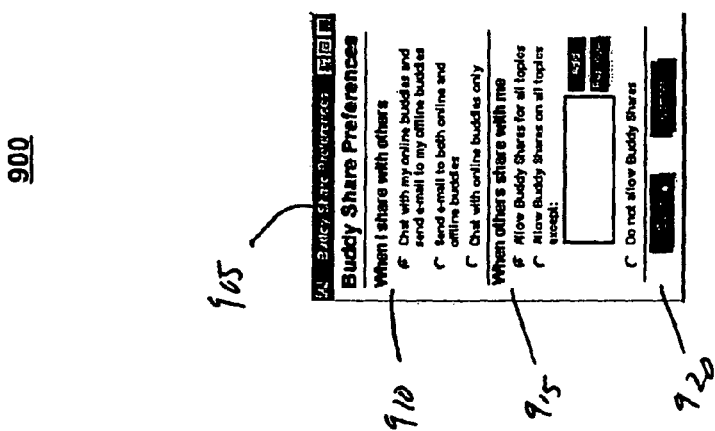

Referring to FIG. 9, a user interface 900 may be displayed upon activation of the set preferences option 750 or 850. As shown, the buddy share preferences interface UI 905 contains options to control how the system is to behave when the sharing user shares information with other recipients 910, and options for controlling how the system is to behave when recipients share information with the sharing user 915. A control panel 920 is also provided.

Figure 10:
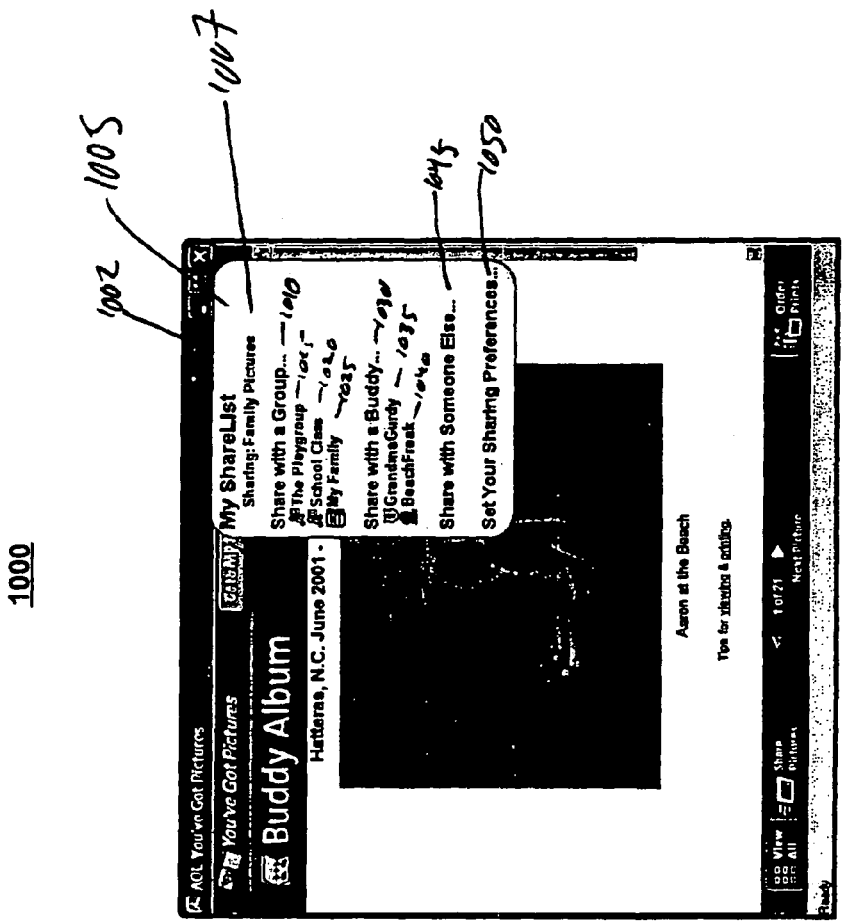

As another example, FIG. 10 shows a UI 1000 that enables the sharing of a photograph or photographs within a digital photographic album. A My Share List interface 1005 is provided, and indicates that the content being shared 1007 is family pictures. Options are presented to share the picture with a group 1010. The groups include The Playgroup 1025, the School Class 1020, and My Family 1025. Options are also provided to share the picture with a buddy 1030 such as GrandmaGurdy 1035 and BeachFreak 1040. Options are also provided to share the picture with someone else 1045 and to set sharing preferences 1050.

Referring again to FIG. 5, the content is shared with one or more recipients (step 525). Sharing the content may include the sharing user acting to select one or more of the determined recipients with whom to share the content. For example, referring to FIG. 7, the sharing user may select a group 710 with whom to share the content, or the sharing user may select an individual buddy 730 with whom to share the content. In sharing a group, the sharing user may pick one of the groups presented 715, 720, 725, one of the individual buddies presented 735, 740, or someone else 715 with whom to share the content.

The online content to be shared by the sharing user system 305A is identified to the recipient.

The online content being shared by the sharing user system 305A may be rendered to the recipient through an application program such as a media player or a web browser. The content may include images and sounds, including streaming images and sounds, such as, for example, photographs, audio content, and video content. Also, a uniform resource locater (URL) or another identifier may be associated with the online content to assist a recipient in locating and accessing the content.

A suitable communication method may be used to share the content with the recipient. Examples of possible communications methods include IM, chat, and e-mail.

The processing of the invitation to share content may be done manually or may be done automatically, and may be based upon a set of pre-defined rules. For example, a recipient may authorize an invitation to share content from the sharing user to be automatically accepted, or automatically rejected, without requiring intervention by the recipient. A flag or other indicator contained within the invitation may assist in the automatic processing of the invitation.

Referring again to FIG. 5, after content is shared with the one or more determined recipients, the records reflecting with which recipients the sharing user has shared certain types of content is updated (step 530).

FIG. 6 illustrates one possible implementation of a method 600 for determining the set of recipients likely to be interested in the content, as discussed, for example, with respect to step 515 of procedure 500. First, the content to be shared is identified in a manner that will enable a recipient to navigate to that content (step 602). The content may be manually or automatically identified. For example, the content may be automatically identified by the sharing user system 305A. This automatic identification may rely on a uniform resource locator (URL) or another identifier that is associated with the online content to assist in the location and accessing of the content by a recipient.

Next, a determination is made as to whether the content has been classified (step 605). If the content has not been classified, then classification of the content is requested (step 610). The request for classification may be a request for manual classification by the sharing user, or the request may be a request for automatic classification. Automatic classification may be performed, for example, by an expert system or an application program such as a browser.

If the content has been classified, then the classification of the content is determined (step 615). The determination of the content classification includes determination of the classification at a selected granularity level. The granularity may be selected by the user or may be selected automatically using a default value or an iterative process that adjusts the granularity until a sufficient number of potential recipients are obtained through process 600. For example, the determination of classification may include an iterative process starting out at one granularity level of classification and stepping through broader or narrower classifications until a sufficient number of recipients are obtained. For example, at the completion of procedure 600, a determination may be made as to whether a sufficient number of recipients have been identified. If a sufficient number of recipients have not been identified, then procedure 600 may be repeated using a broader or narrower granularity for classification depending upon whether too many or too few results were obtained.

In one implementation, content of interest may be manually or automatically associated with a category from a predefined list of categories by the sharing user system 305A. For example, the sharing user system may identify the playing of a song by a media player running on the sharing user system. The song may have an associated first URL that is used by the media player to retrieve the song and play the song for the sharing user. The song may be classified in a category (i.e., music), and may also be further classified in other categories such as entertainment or sub-categories such as classical, jazz, country or rock music. The online content may be categorized by the sharing user, by a recipient, by the host system 110, by a host other than host system 110, or by another user or device. In one implementation, the content of interest is reported to the host system 110 by the sharing user system 305A. The host system 110 may store the content accessed by the sharing user in a data store, along with tracking information for any category or subcategory thereafter.

Next, a stored list of recipients may be retrieved based on the classification (step 618). The stored list may be stored in a data store on the sharing user system 305A or on the host system 110. The stored list may contain a list of recipients corresponding to the content classification. If a stored list is to be used, then the procedure may skip ahead to step 660, or optionally the procedure may proceed in order using the stored list as a starting point. If a stored list is not to be used, then step 618 may be omitted entirely.

Next, recipients who may be interested in the content are determined based on identifying recipients with whom the identified classification of content has been previously shared (step 620). Various sources may be used to determine the recipients with whom the sharing user has previously shared the identified class of content. For example, a data store on the sharing user system 305A or on a host system 110 may contain a sharing history of recipients based on the content classification.

As a supplement or an alternative to step 620, users who have shared this classification of content with the sharing user may be determined (step 625). As with step 620, various sources may be used to determine the set of recipients who have previously shared the same or similar class of content with the sharing user.

As a supplement or an alternative to steps 620 and 625, a set of recipients who may be interested in the particular content may be determined based on information that the recipients have made available about themselves (step 630). For example, the recipients may make information concerning their interests available in a member directory or may make information concerning their recently-viewed content available to sharing users. A sharing user may then use this information made available by the recipients to determine whether or not a recipient may be interested in particular content.

As a supplement or an alternative to steps 620, 625 and 630, a set of recipients who may be interested in the content may be determined based on active manipulation by the sharing user (step 635). For example, the sharing user may actively select one or more recipients whom the sharing user believes will be interested in the content.

As a supplement or an alternative to steps 620, 625, 630 and 635, a set of recipients who may be interested in the content may be determined based on information provided by a third party (step 640), passive personalization techniques (step 645), and/or a relationship between the sharing user and the recipient (step 650). For example, recipients may be placed in a particular category (e.g., family, work, friends) in the sharing user's buddy list, and may therefore be interested in the particular content by reason of this grouping.

Next, a complete set of recipients who may be interested in the content is generated (step 655). The complete list is generated by manipulating each of the various set of users identified using the techniques discussed in steps 618, 620, 625, 630, 635, 640, 645, and 650. For example, the complete list could be the sum of each of the sets identified in steps 618, 620, 625, 630, 635, 640, 645, and 650, or the complete list could be the intersection of these sets. Other arrangements are possible.

Next, the stored list of step 618 optionally may be updated and/or saved (step 660).

The relative order of steps 505-530 with respect to other steps in procedure 500, and the relative order of steps 602-660 with respect to other steps in procedure 600, and also with respect to each other, may vary. Also, certain steps may be omitted as appropriate.

Other implementations are within the scope of the following claims. For example, if previously shared content is later updated, the content may be automatically shared with the recipients who last received the content. The updated content may be automatically shared with the recipients with whom it was previously shared, or the user may be alerted to the presence of updated content and given an option to share the updated content.

What is claimed is:

1. A computer-implemented method of sharing electronic content comprising:
    classifying, by at least one processor, electronic content perceived by a sharing user at least by identifying a change in the electronic content;
    analyzing the electronic content type to determine whether the electronic content is sharable;
    rendering on a user interface a visual representation indicating that the electronic content is sharable, the visual representation including an animated alert;
    determining, by the at least one processor, whether the electronic content has been previously shared by the sharing user;
    presenting, to the sharing user, the visual representation on the user interface indicating that the electronic content has been shared when the electronic content is determined to be previously shared;
    determining, by the at least one processor, a set of recipient candidates likely to be interested in the electronic content based upon the classification of the electronic content, the changed electronic content, and prior sharing activity of the recipients with respect to electronic content of the same or similar classification;
    presenting to the sharing user on the user interface one or more members of the set of recipient candidates for sharing the electronic content being perceived by the sharing user;
    receiving an online presence status for one or more members of the set of recipient candidates;
    presenting to the sharing user on the user interface one or more communications options for sharing the electronic content with a recipient candidate, the communication options comprising a first communication option to communicate with users with a first online presence status and a second communication option to communicate with users with a second online presence status; and
    receiving, via the user interface, a selection of the one or more members of the set of recipient candidates for sharing the electronic content.

2. The method of claim 1 wherein classifying electronic content further comprises determining a level of classification granularity.

3. The method of claim 2 wherein determining a level of granularity comprises:
    selecting a starting granularity level;
    determining whether a sufficient number of recipients has been identified; and
    iteratively modifying the granularity level when a sufficient number of recipients has not been identified.

4. The method of claim 1 wherein determining the set of recipient candidates comprises determining the set of recipient candidates based upon information made available by a potential recipient candidate.

5. The method of claim 1 wherein determining the set of recipient candidates comprises determining the set of recipient candidates based upon active manipulation by the sharing user.

6. The method of claim 1 wherein determining the set of recipient candidates comprises determining the set of recipient candidates based upon information supplied by a third party.

7. The method of claim 1 wherein determining the set of recipient candidates comprises determining the set of recipient candidates based upon passive personalization.

8. The method of claim 1 wherein classifying the electronic content comprises automatically classifying the content at a sharing user system.

9. The method of claim 1 wherein determining the set of recipient candidates comprises determining the set of recipient candidates dynamically.

10. The method of claim 1 wherein determining a set of recipient candidates comprises selecting the one or more recipient candidates based on a matching between the electronic content and an interest of the recipient.

11. The method of claim 1 wherein determining a set of recipient candidates comprises selecting the one or more recipient candidates by a sharing user system.

12. The method of claim 1 wherein determining a set of recipient candidates comprises selecting the one or more recipient candidates by a host system.

13. The method of claim 1 further comprising sharing the electronic content using at least one of an instant message, a chat room, and an e-mail message.

14. The method of claim 1 further comprising:
    receiving an online presence status for one or more members of the set of recipient candidates;
    presenting a first communication option to the sharing user to communicate with users with a first online presence status; and
    presenting a second communication option to the sharing user to communicate with users with a second online presence status.

15. The method of claim 1 wherein presenting one or more communications options comprises configuring one or more communications channels.

16. The method of claim 1 wherein the communications channels comprise one or more of an instant messaging communications channel, a chat communications channel, and an e-mail communications channel.

17. The method of claim 1 further comprising identifying electronic content based on a uniform resource locator.

18. The method of claim 1 wherein the visual representation comprises an audible indication.

19. The method of claim 1 further comprising storing the set of recipient candidates as a sharing list.

20. The method of claim 19 further comprising retrieving the sharing list.

21. The method of claim 20 further comprising updating the sharing list based upon the determined set of recipient candidates.

22. The method of claim 1 further comprising:
    comparing the electronic type content against a pre-designated content of interest; and
    rendering a user interface suggesting that the user share the electronic content when the pre-designated content matches the electronic content type.

23. A computer program, stored on a tangible non-transitory computer readable medium, the computer program comprising instructions for causing at least one processor to perform operations comprising:
    classifying electronic content perceived by a sharing user at least by identifying a change in the electronic content;
    analyzing the electronic content type to determine whether the electronic content is sharable;
    rendering on a user interface a visual representation indicating that the electronic content is sharable, the visual representation including an animated alert;

determining whether the electronic content has been previously shared by the sharing user;

presenting, to the sharing user, the visual representation on the user interface indicating that the electronic content has been shared when the electronic content is determined to be previously shared;

determining a set of recipient candidates likely to be interested in the electronic content based upon the classification of the electronic content, the changed electronic content, and prior sharing activity of the recipients with respect to electronic content of the same or similar classification;

presenting to the sharing user on the user interface one or more members of the set of recipient candidates for sharing the electronic content being perceived by the sharing user;

receiving an online presence status for one or more members of the set of recipient candidates;

presenting to the sharing user on the user interface one or more communications options for sharing the electronic content with a recipient candidate, the communication options comprising a first communication option to communicate with users with a first online presence status and a second communication option to communicate with users with a second online presence status; and receiving, via the user interface, a selection of the one or more members of the set of recipient candidates for sharing the electronic content.

24. The computer program of claim 23 wherein instructions for classifying electronic content further comprises instructions for determining a level of classification granularity.

25. The computer program of claim 23 wherein instructions for determining the set of recipient candidates comprises instructions for determining the set of recipient candidates based upon information made available by a potential recipient candidate.

26. The computer program of claim 23 wherein instructions for determining the set of recipient candidates comprises instructions for determining the set of recipient candidates based upon active manipulation by-the sharing user.

27. The computer program of claim 23 wherein instructions for determining the set of recipient candidates comprises instructions for determining the set of recipient candidates based upon information supplied by a third party.

28. The computer program of claim 23 wherein instructions for determining the set of recipient candidates comprises instructions for determining the set of recipient candidates based upon passive personalization.

29. The computer program of claim 23 wherein instructions for determining the set of recipient candidates comprises instructions for determining the set of recipient candidates dynamically.

30. The computer program of claim 23 wherein instructions for determining a set of recipient candidates comprises instructions for selecting the one or more recipient candidates based on a matching between the electronic content and an interest of the recipient.

31. The computer program of claim 23 further comprising instructions for causing the at least one processor to perform operations comprising:
receiving an online presence status for one or more members of the set of recipient candidates;
presenting a first communication option to the sharing user to communicate with users with a first online presence status; and
presenting a second communication option to the sharing user to communicate with users with a second online presence status.

32. The computer program of claim 23 wherein instructions for presenting one or more communications options comprises instructions for configuring one or more communications channels.

33. The computer program of claim 23 wherein the communications channels comprise one or more of an instant messaging communications channel, a chat communications channel, and an e-mail communications channel.

34. The computer program of claim 23 further comprising instructions for storing the set of recipient candidates as a sharing list.

35. The computer program of claim 34 further comprising instructions for retrieving the sharing list.

36. The computer program of claim 35 further comprising instructions for updating the sharing list based upon the determined set of recipient candidates.

37. The computer program of claim 23 further comprising instructions for causing the at least one processor to perform operation's comprising:
comparing the electronic type content against a pre-designated content of interest; and
rendering a user interface suggesting that the user share the electronic content when the pre-designated content matches the electronic content type.

38. A user interface system that enables sharing of electronic content, the user interface system comprising:
an application user interface that enables perception of electronic content by a sharing user, the electronic content having been classified at least by identifying a change in the electronic content; and
one or more processors that execute a set of instruction to:
analyze the electronic content type to determine whether the electronic content is sharable;
render on the user interface a visual representation indicating that the electronic content is sharable, the visual representation including an animated alert;
determine whether the electronic content has been previously shared by the sharing user;
present, to the sharing user, a visual representation on the user interface indicating that the electronic content has been shared when the electronic content is determined to be previously shared;
receive a set of recipient candidates determined likely to be interested in the electronic content based upon the classification of the electronic content, the changed electronic content, and prior sharing activity of the recipients with respect to electronic content of the same or similar classification;
present to the sharing user on the user interface one or more members of the set of recipient candidates for sharing the electronic content being perceived by the sharing user;
receive an online presence status for one or more members of the set of recipient candidates;
present to the sharing user on the user interface one or more communications options for sharing the electronic content with a recipient candidate, the communication options comprising a first communication option to communicate with users with a first online presence status and a second communication option to communicate with users with a second online presence status; and receive, via the user interface, a selection of the one or more members of the set of recipient candidates for sharing the electronic content.

39. The user interface system of claim 38 wherein the one or more processors are further adapted to:
enable one or more menu options for a recipient candidate based upon the online presence status of the recipient candidate, with menu options enabled for a first online presence state differing from menu options enabled for a second online presence state; and
present the enabled menu options to the sharing user.

40. The user interface system of claim 38 wherein the one or more processors are further adapted to configure one or more communications channels.

41. The user interface system of claim 38 wherein the communications channels comprise one or more of an instant messaging communications channel, a chat communications channel, and an e-mail communications channel.

42. The user interface system of claim 38 wherein the visual representation comprises an audible indication.

43. The user interface of claim 38 wherein the one or more processors are further adapted to:
compare the electronic content type against a pre-designated content of interest; and
render a user interface suggesting that the user share the electronic content when the pre-designated content matches the electronic content type.

* * * * *